(12) United States Patent
Daly, Jr.

(10) Patent No.: US 11,682,140 B1
(45) Date of Patent: Jun. 20, 2023

(54) METHODS AND APPARATUS FOR CALIBRATING STEREO CAMERAS USING A TIME-OF-FLIGHT SENSOR

(71) Applicant: PlusAI, Inc., Cupertino, CA (US)

(72) Inventor: Timothy P. Daly, Jr., San Jose, CA (US)

(73) Assignee: PlusAI, Inc., Cupertino, CA (US)

( * ) Notice: Subject to any disclaimer, the term of this patent is extended or adjusted under 35 U.S.C. 154(b) by 0 days.

(21) Appl. No.: 17/855,512

(22) Filed: Jun. 30, 2022

(51) Int. Cl.
G06T 7/80 (2017.01)

(52) U.S. Cl.
CPC ...... *G06T 7/85* (2017.01); *G06T 2207/10016* (2013.01); *G06T 2207/30252* (2013.01)

(58) Field of Classification Search
CPC ............. G06T 7/85; G06T 2207/10016; G06T 2207/30252
USPC .......................................................... 348/47
See application file for complete search history.

(56) References Cited

U.S. PATENT DOCUMENTS

| 9,538,162 | B2 * | 1/2017 | Choi .................... H04N 13/271 |
| 10,891,745 | B1 * | 1/2021 | Potter ................... G01S 17/931 |
| 2017/0323459 | A1 * | 11/2017 | Ermilios .................... G06T 7/80 |
| 2018/0189550 | A1 * | 7/2018 | McCombe ........... G06V 40/166 |
| 2018/0210465 | A1 * | 7/2018 | Qu .......................... B64D 47/08 |
| 2018/0232868 | A1 * | 8/2018 | Ito ......................... H04N 13/254 |
| 2018/0262744 | A1 * | 9/2018 | Tadi ..................... H04N 13/271 |

OTHER PUBLICATIONS

U.S. Appl. No. 17/855,168, filed Jun. 30, 2022, inventor Timothy P. Daly.

* cited by examiner

*Primary Examiner* — Susan E. Torgerson
(74) *Attorney, Agent, or Firm* — Sheppard Mullin Richter & Hampton LLP

(57) ABSTRACT

A system for calibrating stereo cameras using time-of-flight (ToF) includes a stereo camera system and a ToF sensor onboard a vehicle. The system receives stereo image data depicting a scene and ToF sensor data captured during stationary or moving operations of the vehicle. The system associates the ToF sensor data to the stereo image data by projection onto the stereo image data to filter out stereo depth errors. The system converts distance measurements based on the ToF sensor data to disparities in the stereo image data. The system further filters out the disparities between the ToF sensor and the stereo camera system using a voting scheme to populate a histogram with disparities. The system can select the peak of the histogram and correct the stereo image data with the disparity results in the peak, to correct stereo image data during operation of the vehicle.

20 Claims, 5 Drawing Sheets

METHODS AND APPARATUS FOR CALIBRATING STEREO CAMERAS USING A TIME-OF-FLIGHT SENSOR

FIELD

The present disclosure generally relates to time imaging technologies applicable to vehicle control, for example for autonomous vehicles or partially autonomous vehicles (e.g., driver-assisted vehicles), and more specifically, to methods of calibration of stereo imagery.

BACKGROUND

The operation of a vehicle relies heavily on a driver's awareness of the vehicle's surroundings as well as the driver's response to such surroundings. Vehicles, such as autonomous vehicles, typically include a wide variety of electronics such as cameras, global positioning system (GPS) navigation systems, radar systems, lidar systems, sonar systems, and/or inertial measurement units (IMUs). Such electronics can be used to track and/or control the vehicles. For example, multiple cameras and sensors can be positioned around the body of an autonomous vehicle, capturing a complete view of the surroundings from multiple angles.

SUMMARY

In some embodiments, a system for calibrating stereo cameras using a ToF sensor includes a stereo camera system onboard a vehicle (the stereo camera system including a primary camera and a secondary camera), a ToF sensor onboard the vehicle, a processor operably coupled to the stereo camera system, and a memory operably coupled to the processor. The memory stores instructions to cause the processor to receive, from the stereo camera system, stereo image data depicting a scene, and to receive sensor data from the ToF sensor. The memory also stores instructions to cause the processor to project the sensor data. The memory also stores instructions to cause the processor to identify a plurality of ToF disparities based on the ToF distance measurements, and to select a subset of ToF disparities from the plurality of ToF disparities. The selection of the subset of ToF disparities is based on a proximity of each ToF disparity from the subset of ToF disparities to an expected disparity value from a non-zero set of expected disparity values. The memory also stores instructions to cause the processor to apply a correction to the stereo image data based on the subset of ToF disparities.

In some embodiments, a non-transitory, processor-readable medium stores instructions that, when executed by a processor, cause the processor to receive stereo image data from a stereo camera system onboard a vehicle, the stereo image data depicting an image of a stationary object, and to receive sensor data from a ToF sensor onboard the vehicle. The sensor data can include sensor data associated with the stationary object. The instructions also include instructions that, when executed by a processor, cause the processor to calculate a plurality of ToF distances, for example using a projection function with the sensor data and the stereo image data as inputs. The non-transitory, processor-readable medium also stores instructions to cause the processor to determine a distance between the stationary object and the vehicle, the distance being associated with a time of capture of the stereo image data. The non-transitory, processor-readable medium also stores instructions to cause the processor to (1) apply a first correction to the stereo image data based on a stereo disparity calculated based on the stereo image if the distance between the stationary object and the vehicle is below a predefined threshold, or (2) apply a second correction to the stereo image data based on a plurality of ToF disparities calculated based on the plurality of ToF distances if the distance between the stationary object and the vehicle is not below the predefined threshold.

In some embodiments, a processor-implemented method for calibrating stereo cameras using a ToF sensor includes receiving stereo image data from a stereo camera system including a primary camera and a secondary camera and positioned onboard a vehicle, the stereo image data depicting a scene. The method also includes receiving sensor data from at least one of a lidar sensor or a radar sensor onboard the vehicle. The method also includes calculating a plurality of distances using a projection function with the sensor data and a representation of the scene as inputs, and identifying a plurality of disparities based on the plurality of distances. The method also includes selecting a subset of disparities from the plurality of disparities based on a proximity of each disparity from the subset of disparities to an expected disparity value from a non-zero set of expected disparity values, and applying a correction to the stereo image data based on the subset of disparities.

DETAILED DESCRIPTION

Figure 1:
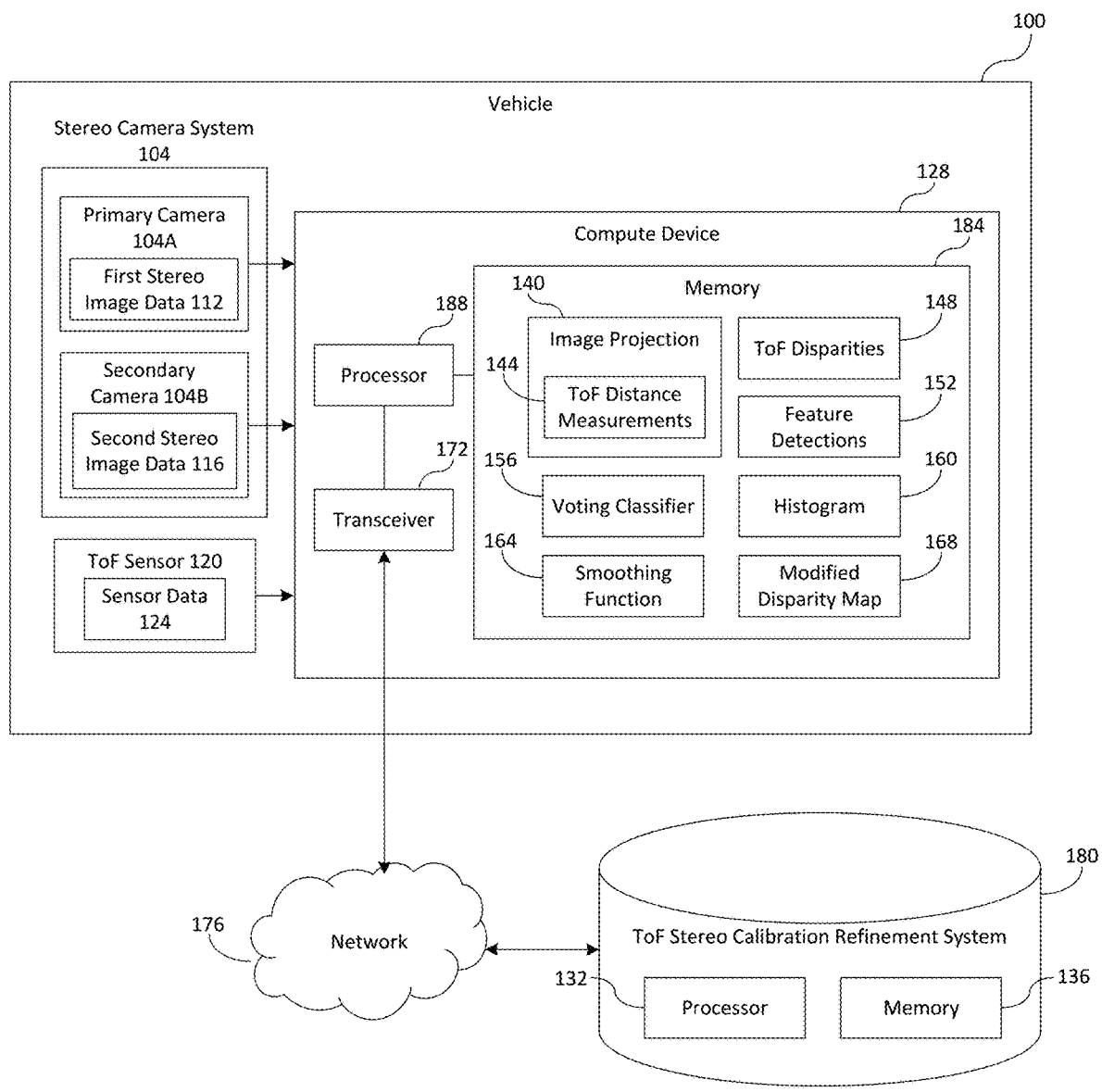
FIG. 1 is a diagram illustrating a ToF stereo calibration refinement system for a vehicle, according to some embodiments.

Sensors that can directly produce three-dimensional (3D) data (e.g., point clouds, depth maps), are particularly useful because they allow a vehicle (e.g., an autonomous vehicle) to robustly avoid collisions and better predict the behavior of other traffic participants. These 3D sensors can be divided into two classes: passive, such as stereo cameras, and active, such as time-of-flight sensors like lidar and radar. It can be useful to equip both active and passive sensors on an autonomous vehicle because of their complementary qualities. In particular, the active sensors typically have a lower resolution and range, due to factors such as energy emission limits and pulse repetition frequency or bandwidth, but the depth error in the sensed data is roughly a constant. A stereo camera, on the other hand, can have unlimited range and extremely high resolution, but its depth error grows quadratically with distance, and it is quite sensitive to calibration errors.

Methods and apparatuses described herein facilitate improved correction of stereo imagery (e.g., including corrections to depth accuracy), such as stereo imagery generated by one or more stereo camera systems onboard a vehicle (e.g., an autonomous vehicle), for example while the vehicle is traveling, and optionally in real-time or substantially real-time. The methods and apparatuses can also be used to calibrate stereo cameras, optionally in an "online" manner (e.g., during operation of the vehicle and/or stereo cameras). More specifically, data can be generated by a time-of-flight (ToF) sensor such as a radar and/or a LIDAR. The ToF sensor data can be used to improve calibration of disparity maps generated from stereo imagery as well as their limitations in depth perception. For example, the high noise variations due to low resolution limitations of ToF sensors can be filtered using a voting scheme. For example, the ToF sensors (or a processor operably coupled to the ToF sensors) can generate a pseudo-disparity depth map of the same scene captured by the stereo camera.

Data generated by ToF sensors such as radar and/or LIDAR sensors can include error (e.g., related to associated time measurements), and this error can be relatively constant with respect to distance, whereas data generated by stereo-based cameras can have an associated error that grows quadratically with the distance of an object/scene from the stereo-based camera. The accuracy of ToF sensors can therefore outperform stereo cameras for overlapping distance ranges, and this difference in performance can be leveraged to improve stereo camera calibration accuracy in an online and efficient manner. For example, refinements to stereo camera data and stereo camera calibration data can be applied in an online fashion and stored and/or logged in the memory of a remotely located ToF stereo calibration refinement system for reproducibility. The ToF stereo calibration refinement system can be deployed/copied into a memory of a vehicle (e.g., an autonomous vehicle). Unlike motion-based stereo calibration refinement, ToF-based stereo calibration refinement can be performed for/using a single frame, even if the vehicle is not moving. ToF-based stereo adjustments can also take advantage of dynamic obstacles in a scene captured by the cameras/sensors.

In some embodiments, an algorithm for ToF-based stereo calibration refinement can include associating ToF data with stereo data by projecting the ToF data into the stereo image to filter out stereo depth errors. The algorithm can also include converting ToF distance measurements from the ToF data into disparity measurements in the stereo image. This conversion of ToF distance measurements from the ToF data into disparity measurements in the stereo image can result in multiple differences in ToF "pseudo disparities" and stereo disparities. The disparity differences can represent noise due, for example, to low resolution limitations of ToF sensors. The algorithm can also include filtering out noise and/or disparity differences by using a voting scheme to discard ToF pseudo disparities that are not close to an expected value. In some cases, there can be more than a desirable number of remaining ToF pseudo disparities, in which case the ToF-based stereo calibration refinement algorithm can include generating a histogram and populating it with the remaining ToF pseudo disparities. The peak of the histogram can represent the ToF pseudo disparities closest to the expected value. The algorithm can further include smoothing the histogram and selecting the ToF pseudo disparity (or disparities) at/near the peak of the histogram. The algorithm can further include applying a correction to the original stereo image with the selected ToF pseudo disparity, thereby correcting the stereo image. The algorithm can also include smoothing the resulting stereo correction (e.g., using an exponential moving average) to account for expected slow changes in stereo extrinsic parameters due, for example, to temperature changes, vehicle movement, wind pressure, or the like. The ToF-based stereo calibration refinement algorithm can also be applied in an online fashion and logged in a memory for reproducibility.

The ToF stereo calibration refinement system can use the pseudo-disparity from the ToF sensors to compare the stereo disparities from the stereo images and/or from a stereo camera system. A "ToF pseudo-disparity," as used in this disclosure, can refer ToF data and/or ToF sensor data that is transformed into a coordinate frame of the stereo camera. The ToF stereo calibration refinement system can calculate the ToF pseudo-disparity by transforming the ToF data into the coordinate frame of the stereo camera using a rigid-body transform, where it is projected into the stereo image(s) using the stereo camera's intrinsics matrix to obtain a pixel (x, y coordinate) with an associated distance z. The distance can then be converted to a ToF pseudo-disparity using a stereo calibration (e.g., d'=fb/z, where "d" refers to the ToF pseudo-disparity, "f" refers to focal length, "b" refers to baseline, and "z" refers to depth, and a disparity correction can be calculated as d'−d, where "d" is the original disparity value from the stereo camera). The ToF stereo calibration refinement system can then calculate a disparity correction to be applied to the stereo image(s), where the disparity correction is the difference between the ToF pseudo-disparity and the stereo disparity of the stereo image(s).

The ToF stereo calibration refinement system can determine differences between the ToF pseudo-disparities and stereo disparities to filter out noise caused by the relatively low resolution of the ToF sensor(s). The ToF stereo calibration refinement system can implement, for example, a voting scheme to discard the disparities (ToF pseudo-disparities and stereo disparities) where their differences are not close to one or more pre-defined expected value(s), and select (or not discard) the disparities where their differences are closer to the expected value(s). The ToF stereo calibration refinement system can form a histogram and populate it with multiple disparity corrections. In some cases, the differences can include the differences in disparity value(s) at each pixel of an image and/or images. The histogram can represent disparities that can be used to correct stereo images. In some cases, a peak portion of the histogram can be populated with disparities whose differences are within an acceptable range of the expected value. The ToF stereo calibration refinement system can use a smoothing algorithm on the disparities found in the peak portion of the histogram. In some cases, the peak portion of the histogram can include disparities whose differences that are closest to the expected value(s). Smoothing can be used to apply a correction of the stereo image using, for example, exponential moving average, to account for the expected slow changes in stereo extrinsic factors due to temperature changes, vehicle movement, wind pressure, etc.

FIG. 1 is a diagram of a ToF stereo calibration refinement system for a vehicle 100. The vehicle 100 can operate in a manual driving mode, or the vehicle 100 can operate in a manual driving mode during one time period and operate in a partially autonomous mode or a fully autonomous driving mode (i.e., as an "autonomous vehicle") during a different time period. As used herein, "autonomous vehicles" can include, for example, a fully autonomous vehicle, a partially autonomous vehicle, a vehicle with driver assistance, or an autonomous capable vehicle. The capabilities of autonomous vehicles can be associated with a classification system or taxonomy having tiered levels of autonomy. A classification system can be specified by, for example, industry standards or governmental guidelines. For example, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention). In some instances, a given level can include the capabilities included in the lower level(s); for example, level 2 can include the momentary driver assistance of level 0 and the driver assistance of level 1 but can also include additional assistance associated with level 2. An autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode. For example, an autonomous capable vehicle can operate in a given level (e.g., level 2), which can be deactivated to allow a driver to operate the vehicle manually (i.e., in a manual driving mode). As used herein, the term "driver" may refer to a local operator (e.g., an operator in the vehicle) or a remote operator (e.g., an operator physically remote from and not in the vehicle). The autonomous vehicle may operate solely at a given level (e.g., level 2 additional assistance or level 5 full automation) for at least a period of time or during the entire operating time of the autonomous vehicle. Other classification systems can provide other levels of autonomy characterized by different vehicle capabilities. In some implementations, the vehicle 100 can be a medium truck, heavy truck, very heavy truck, semi-truck, greater than 14,000 pounds, greater than 36,000 pounds, greater than 70,000 pounds, or greater than 80,000 pounds. In some implementations, the vehicle 100 is a tractor attached to a trailer.

The vehicle 100 can be connected remotely and/or online to a compute device such as a ToF stereo calibration refinement system 180. A "ToF stereo calibration refinement system," as used in this disclosure, can refer to a compute device used to refine stereo image data using ToF depth measurements. In some implementations, the vehicle 100 can be connected to the ToF stereo calibration refinement system 180 through a network 176 via a transceiver 172, which can be located at the vehicle 100. The ToF stereo calibration refinement system 180 can include any compute device and/or system, such as, without limitation, a microcontroller, microprocessor, digital signal processor (DSP) and/or system on a chip (SoC) as described in this disclosure. The ToF stereo calibration refinement system 180 can include a single compute device operating independently, or can include two or more compute devices operating in concert, in parallel, sequentially or the like; two or more compute devices can be included together in a single compute device or in two or more compute devices. The compute device can interface with or connect with one or more additional devices as described below in further detail via a network interface device. A network interface device (not shown) can be used to connect the compute device to one or more of a variety of networks, and/or to one or more other compute devices. Examples of a network interface device include, but are not limited to, a network interface card (e.g., a mobile network interface card, a LAN card), a modem, and any combination thereof. The ToF stereo calibration refinement system 180 can include one or more compute devices dedicated to data storage, security, dispersal of traffic for load balancing, and the like. The ToF stereo calibration refinement system 180 can distribute one or more computing tasks as described below across multiple compute devices of the compute device, which can operate in parallel, in series, redundantly, or in any other manner used for dispersal of tasks or memory between/among compute devices.

The ToF stereo calibration refinement system 180 can be designed and/or configured to perform any method, method step, or sequence of method steps in any embodiment described in this disclosure, in any order and with any degree of repetition. For example, the ToF stereo calibration refinement system 180 can be configured to perform a single step or sequence recurrently until a desired or commanded outcome is achieved; repetition of a step or a sequence of steps can be performed iteratively and/or recursively using outputs of previous repetitions as inputs to subsequent repetitions, assembling inputs and/or outputs of repetitions to produce an aggregate result, reduction or decrement of one or more variables such as global variables, and/or division of a larger processing task into a set of iteratively addressed smaller processing tasks. The ToF stereo calibration refinement system 180 can perform any step or sequence of steps as described in this disclosure in parallel, such as simultaneously and/or substantially simultaneously performing a step two or more times using two or more parallel threads, processor cores, or the like. Division of tasks between parallel threads and/or processes can be performed according to any protocol suitable for the division of tasks between iterations. Similarly, there are various ways in which steps, sequences of steps, processing tasks, and/or data can be subdivided, shared, or otherwise dealt with using iteration, recursion, and/or parallel processing.

The vehicle 100 can also include a compute device 128 containing a memory 184 operatively coupled to a processor 188. The compute device 128 can also include any compute device and/or system, such as, without limitation, a microcontroller, microprocessor, digital signal processor (DSP) and/or system on a chip (SoC) as described in this disclosure. Compute device 128 can include a single compute device operating independently, or can include two or more compute devices operating in concert, in parallel, sequentially or the like; two or more compute devices can be included together in a single compute device or in two or more compute devices. The compute device 128 can interface with or connect with one or more additional devices, such as the ToF stereo calibration refinement system 180 via a network interface device. The compute device 128 can distribute one or more computing tasks as described below across multiple compute devices of the compute device, which can operate in parallel, in series, redundantly, or in any other manner used for dispersal of tasks or memory between/among compute devices. The compute device 128 of the vehicle 100 can also receive a copy of the memory 136 of the ToF stereo calibration refinement system 180, in which the ToF stereo calibration refinement system 180 can be deployed onto the vehicle 100.

The vehicle 100 includes multiple cameras on board the vehicle 100. In some cases the multiple cameras can be positioned on the outer body of the vehicle 100 and/or positioned to capture imagery outside the vehicle 100, so as to provide a complete view of the surroundings of the vehicle 100. The multiple cameras can include one or more stereo camera systems 104, each stereo camera system 104 having a primary camera 104A and a secondary camera 104B. In some implementations of the stereo camera system 104, one or both of the primary camera 104A and the secondary camera 104B includes at least one lens. Each of the primary camera 104A and the secondary camera 104B includes its own dedicated image sensor. In some cases, the intra-axial distance, i.e., the distance between the primary camera 104A and the secondary camera 104B and/or between lenses of the primary camera 104A and the secondary camera 104B, can include an intra-ocular distance that is similar to the distance between a person's eyes (i.e., about 6.35 cm). The intra-ocular distance can also be referred to as a baseline. The vehicle 100 can include multiple stereo camera systems having inter-camera distances in any number of configurations, for example to produce greater three-dimensionality. The vehicle 100 also includes a time-of-flight (ToF) sensor 120 on board the vehicle 100. The ToF sensor can refer to a range imaging camera system employing time-of-flight techniques to resolve distance between the ToF sensor and a subject which the ToF sensor is pointed towards, for each point of an image, e.g., by measuring the round-trip time of an artificial light signal provided by a laser or an LED. In some cases, the ToF sensor 120 can include a LIDAR sensor, a radar sensor, or the like. The ToF sensor 120 can also include any laser-based ToF sensor, such as a scannerless LIDAR configured to capture an entire scene with each laser pulse, as opposed to point-by-point with a laser beam such as in scanning LIDAR systems and/or sensors. The vehicle 100 can include multiple ToF sensors 120 throughout the body of the vehicle 100. In some cases, each stereo camera system 104 can be accompanied by one or more associated ToF sensors 120.

The compute device 128 of the vehicle 100 can be connected to the stereo camera system 104, such as the primary camera 104A and/or the secondary camera 104B, and to the ToF sensor 120 to capture scenes for the ToF stereo calibration refinement system 180. The compute device 128 of the vehicle 100 includes a processor 188 operably coupled to a memory 184. In some implementations the processor 188 can be operably coupled to the primary camera 104A, the secondary camera 104B, and/or the ToF sensor 120. The memory 184 of the vehicle 100 stores instructions that are executable by the processor 188. In some implementations, the processor 132/188, primary camera 104A, secondary camera 104B, stereo camera system 104, ToF sensor 120, and/or memory 136/184 are operatively coupled to one another via a control area network (CAN) bus (not shown in FIG. 1) included in the vehicle 100 and/or ToF stereo calibration refinement system 180. The processor 132/188 can be, for example, a hardware based integrated circuit (IC), or any other suitable processing device configured to run and/or execute a set of instructions or code. For example, the processor 132/188 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 132/188 can be configured to perform any of the methods and/or portions of methods discussed herein.

The memory 136/184 can be or include, for example, a random-access memory (RAM), a memory buffer, a hard drive, a read-only memory (ROM), an erasable programmable read-only memory (EPROM), and/or the like. In some instances, the memory 136/184 can store, for example, one or more software programs and/or code that can include instructions to cause the processor 132/188 to perform one or more processes, functions, and/or the like. In some implementations, the memory 136 can include extendable storage units that can be added and used incrementally. In some implementations, the memory 136/184 can be a portable memory (e.g., a flash drive, a portable hard disk, and/or the like) that can be operatively coupled to the processor 132/188. In some instances, the memory 136 can be remotely operatively coupled with one or more remote compute devices such as the ToF stereo calibration refinement system 180. The ToF stereo calibration refinement system 180 can be located offboard the vehicle 100 and include a database that can serve as/include additional memory and be operatively coupled to the compute device 128 of the vehicle 100 via the network 176.

In some implementations, the memory 136/184 also stores a representation of CAN data. The vehicle 100 can include multiple electronic control units (ECUs), such as an engine control module (ECM), a powertrain control module (PCM), a transmission control module (TCM), a brake control module (BCM), a central control module (CCM), a central timing module (CTM), a general electronic module (GEM), a body control module (BCM), a suspension control module (SCM), and/or the like. The CAN data can include for example representations of communications between multiple ECUs. In some implementations, the CAN data can include for example information about a state of the vehicle 100, such as the vehicle's 100 speed, location, tire pressure, internal temperature, audio being played, lights that are on, windshield wiper setting, window settings, tractor and trailer state, and/or the like. Additionally, the CAN data can include information of a change of state of the vehicle 100, such as a change in the vehicle's 100 speed, a change in the vehicle's 100 location, a change in the vehicle's 100 tire pressure, a change in the vehicle's 100 internal temperature, a change in audio being played by the vehicle 100, a change in light settings of the vehicle 100, a change in windshield wiper settings of the vehicle 100, a change in window settings of the vehicle 100, and/or the like.

The processor 188 at the vehicle 100 can be instructed by the memory of the vehicle 184 to transmit any data, (e.g. first stereo image data 112, second stereo image data 116, sensor data 125, etc.) to the ToF stereo calibration refinement system 180. In some cases, the processor 132 of the ToF stereo calibration refinement system 180 can be instructed by the memory 136 of the ToF stereo calibration refinement system 180 to receive the data. This is so, at least in part, to calibrate stereo image data (first stereo image data 112 and/or second stereo image data 116) offboard the vehicle 100. The primary camera 104A and the secondary camera 104B can be used to capture a scene and/or generate stereo image data (e.g., first stereo image data 112 and second stereo image data 116) depicting the scene. A "scene," as used in this disclosure, can refer to an observable view of an outside surrounding are of the vehicle, where the view can change during the motion and operation of the vehicle. For example, the scene can include a road, sidewalk, other vehicles, traffic lights, stop signs, overhead bridges, roundabouts, crosswalks, intersections, pedestrians, and/or the like. The scene can include a single captured image. In some cases, the scene can include a video frame of multiple image frames continuously being captured throughout the operation of the vehicle 100. The operation of the vehicle 100 can include the journey of the vehicle from one destination to another destination. The operation can also include multiple driving maneuvers such as, breaking, accelerating, turning, parking, and/or the like.

The stereo image data can include a first stereo image data 112 and a second stereo image data 116 captured by the primary camera 104A and secondary camera 104B onboard the vehicle 100. "Stereo image data," as used in this disclosure, can refer to image data produced via stereoscopy from a stereo camera system (e.g., stereo camera system 104), where the image data contains representations of depth from the captured two-dimensional and/or three-dimensional image of a scene. Each of primary camera 104A and secondary camera 104B can measure distances using triangulation. The length of the base of the triangle from the triangulation is called the disparity:

$$d = \frac{fb}{z}$$

where d is the disparity of the applicable camera, f is the focal length, b is the baseline, and z is the distance. In some embodiments, the disparity can also be represented as:

$$d = x - x' = \frac{b \cdot f}{z}$$

where x is a pixel and/or location of a left (rectified) image and x' is a pixel and/or location of a right (rectified) image. The stereo error (distance) present in the stereo image data from the primary camera 104A and the secondary camera 104B increases quadratically with the distance:

$$\delta z = \frac{-z^2}{c} |\delta d|$$

where z is the distance, d is the stereo disparity, and c is fb. As such, the resolution of the depth from the stereo camera system 104 drops quadratically with distance. In some instances, each camera from the primary camera 104A and the secondary camera 104B can be caused by the processor 188 to capture a scene based on instructions in the memory 184. The placement of each of cameras 104A and 104B relative to the vehicle 100 can result in two slightly disparate images depicting the locations of certain objects in a scene. This can be referred to as binocular disparity, which refers to the difference in image location of an object seen by one stereo camera/lens and another neighboring stereo camera/lens, resulting from the camera's/lens's parallax. In some instances, the primary camera 104A and secondary camera 104B can use binocular disparity to extract depth information and the difference in coordinates of similar features within two stereo images, such as the first stereo image data 112 and second stereo image data 116.

As discussed above, in some implementations, the ToF disparities 148 can be calculated by transforming the ToF data (e.g., sensor data 124) into a coordinate frame of the stereo camera system 104 using a rigid-body transform, where it is projected into the stereo image data 112/116 using the intrinsics matrix of the stereo camera system 104 to obtain a pixel (x, y coordinate) with an associated distance z. The distance is then converted to a pseudo-disparity (e.g., ToF disparity 148) using stereo calibration, according to the following equation:

$$d' = \frac{fb}{z}$$

The correction to be applied to the stereo image data 112/116 can include or be represented by d'−d, where d is the original stereo disparity from the stereo camera system 104, where the correction(s) is used to populate a histogram 160.

In some embodiments, prior to generating the stereo image data, the processor 132/188 can be caused by the instructions from the memory 136 of the ToF stereo calibration refinement system 180 to calibrate multiple camera parameters of the primary camera 104A, the secondary camera 104B, and/or the ToF sensor 120, for three-dimensional (3D) image processing. Camera parameters can include intrinsic parameters and extrinsic parameters. The intrinsic parameters can include data representing internal features of the applicable camera, such as the focal length, and the extrinsic parameters can include data representing orientation and/or location of the camera. In some implementations, the camera calibration can include estimating the intrinsic and extrinsic parameters using one or more captured images of a scene.

In some cases, 3D images are derived using cameras 104A/104B by computing corresponding pixels for every pixel of an image pair, represented as first stereo image data 112 and second stereo image data 116. The correspondence can be expressed as a disparity vector. For example, if the corresponding pixels are $x_l$ and $x_r$ (subscript "l" referring to a left image and subscript "r" referring to a right image) in the first stereo image data 112 and the second stereo image data 116 respectively, then the disparity map $D_l(x_l, x_r)$ is the difference of their image coordinates. The output of a stereo algorithm thus includes the disparity map, which maps every pixel from one image to every pixel from the other image. In some cases, the processor 132 can be caused by the memory 136 of the ToF stereo calibration refinement system 180 to perform rectification, by the processor 132 and/or the primary camera 104A and the secondary camera 104B, where the image pairs are transformed, for example, by 3×3 homographies (isomorphisms of projective spaces), which align epipolar lines to the corresponding scanlines. In some cases, the algorithms for the rectification can include minimizing a cost function.

The ToF sensor 120 onboard the vehicle 120 can be caused by the processor 132 to capture and/or generate sensor data 124 representing a scene, such as the same scene depicted in the stereo image data as described above. "Sensor data," as used in this disclosure, can refer to data captured and/or produced from a ToF sensor. Sensor data 124 can include time and distance measurements. For example, the ToF sensor 120 can measure the time it takes for a wave of light to travel from the ToF Sensor 120 to an object within a scene and back to the ToF sensor 120. The measurement can be derived from wave propagation, which can enable the ToF sensor 120 to capture 3D images alongside stereoscopic cameras such as the primary camera 104A and the secondary camera 104B. With ToF technology, the wave of light is emitted from a modulated source, such as a laser, and the light beams reflected off one or more objects are then captured by a sensor or camera. The distance can thereby be determined by means of the time delay Δt between when the light is emitted and when the reflected light is received. The time delay is proportional to twice the distance between the camera and the object (round trip). Therefore, the distance can be estimated as $$d = \frac{c \times \Delta t}{2},$$

where d is depth and c is the speed of light. As such, the sensor data 124 of the ToF sensor 120 can include a two-dimensional (2D) output along with depth information based on the waves of light.

In some embodiments, the ToF sensor 120 can generate sensor data 124 using pulsed operation and/or continuous wave operation. In some cases, the elapsed time between emission and reception of the light pulse from a ToF sensor 120 is measured in pulsed mode, and the phase shift between the emitted and received modulated light pulses is determined in continuous wave mode. Pulsed mode is more robust to ambient light, and therefore more conductive to outdoor applications because this technology often relies on high energy light pulses emitted in very short bursts during a short integration window. In some cases, continuous wave mode can be implemented in situations where adequate sensing can be performed without using extremely short pulses/bursts with fast rising/falling edges. In situations where precision sensing conditions are more stringent, however, higher frequency modulation signals may be desired. In some cases, the existing pixel sizes from the sensor data 120 can result in high chip resolutions, which facilitate distance measurements as well as object and gesture recognition. For example, the distances to be measured can range from a few cm (e.g., <10 cm) to several hundred meters (e.g., >500 m). Not all objects can be detected to the same degree. The condition, location, reflectance, and speed of the object can affect the measurement result. In some cases, the measurement results from ToF sensors 120 can also be negatively impacted by environmental factors such as fog or strong sunlight. In some cases, the ToF sensor 120 can reconstruct a returning light wave and/or signal and generate two images: an intensity (gray scale) image derived from the amplitude of the wave and/or signal and a range image (depth measurement per pixel) derived from a phase offset of the wave and/or signal. The ToF sensor 120 can include (or be operatively coupled to) one or more low latency cameras to generate, for example, approximately 20 frames a second with a depth accuracy of approximately 1 cm at 1 m.

In some embodiments, the primary camera 104A, the secondary camera 104A and/or the ToF sensor 120 can include one or more sensors/cameras for collecting a time series data (not shown). "Time series data," as used in this disclosure, can include sequential data captured by sensors in short intervals, e.g., via a sliding window of image frames. The time series data can include images and/or a video input having multiple image frames. For example, the time series data can include multiple frames each associated with a short (e.g., 0.1 second) capture duration. In some cases, the time series data can include one or more of camera data, lidar data, radar data, global positioning system (GPS) data, inertial measurement unit (IMU) data, and/or the like from the primary camera 104A, the secondary camera 104B, and/or the ToF sensor 120. The sensor data 124 can also include, for example, information about the vehicle 100's surrounding environment, such as attributes (e.g., type, size, speed, position, relative distance, acceleration, etc.) of nearby obstacles (e.g., vehicles, buildings, pedestrians, lane dividers, sidewalks, etc.), attributes (e.g., location and size) of shoulder areas, attributes (e.g., shape and grade) of a road, weather conditions, and/or the like. The sensor data can also include information about the vehicle 100 itself, such as the vehicle 100's speed, location, tire pressure, internal temperature, audio being played, lights that are on or off, windshield wiper settings, window settings, tractor and trailer state, and/or the like; additionally or alternatively, such information about the vehicle 100 itself can be indicated by CAN data, as will be discussed below. The sensor data 124 can also include information about a driver of the vehicle 100, such as the driver's posture, facial expression, heart rate, speech, movements, mental state, and/or the like. If the vehicle 100 is a tractor and trailer, sensor data 124 about the tractor and trailer state can include, for example, information about the tractor and trailer, such as if and/or to what extent the trailer is swaying. In some cases, the vehicle 100 can include one or more sensors to observe and gather any information that could be useful for performing the techniques discussed herein, such as information associated with a surrounding environment of the vehicle 100 (e.g., nearby obstacles and their attributes, lane markers and their attributes, weather, etc.), information associated with the vehicle 100 itself (e.g., speed, acceleration rate, location, lane position, etc.), and/or information about a driver of the vehicle 100 (e.g., posture, facial expression, heart rate, speech, movements, mental state, etc.). The one or more sensors can include, for example, a microphone, an inertial measurement unit (IMU), and/or a gyroscope. In some implementations, at least a portion of the one or more sensors, the primary camera 104A, the secondary camera 104B, and/or the ToF sensor 120, can be located on the vehicle 100 such that a substantially 360 degree surrounding of a vehicle 100 can be monitored using data collected by the multiple sensors and cameras on the vehicle 100. In some implementations, a substantially 360 degree surrounding of the vehicle 100 includes a region in front of the vehicle 100, a region to the left of the vehicle 100, a region to the right of the vehicle 100, and a region behind the vehicle 100. In some implementations, a substantially 360 degree surrounding of the vehicle 100 includes at least 300 degrees around the vehicle 100, at least 325 degrees around the vehicle 100, at least 350 degrees, or around the vehicle 100, at least 355 degrees around the vehicle 100, at least 358 degrees around the vehicle 100, at least 359 degrees around the vehicle 100, etc. In some implementations, the primary camera 104A and the secondary camera 104B, the ToF sensor 120, and/or other sensors, can be located at the vehicle 100 and positioned such that a facial expression and/or body posture of a driver of the vehicle 100 can be captured. For example, a camera can be located within a cabin of vehicle 100 and positioned to capture a facial expression and/or body posture of a driver of the vehicle 100.

In some embodiments, the ToF stereo calibration refinement system 180 can include a stereo image processing system for the vehicle 100. The stereo image processing system can be consistent with the stereo image processing system of U.S. patent application Ser. No. 17/855,168, filed Jun. 30, 2022 and titled, METHODS AND APPARATUS FOR CALIBRATING STEREO IMAGERY USING MOTION OF VEHICLE, which is incorporated by reference herein in its entirety. In some implementations, the stereo image processing system can be deployed on the vehicle 100. The memory 136 of the ToF stereo calibration refinement system 180 can cause the processor 132 to store one or more of sensor data 120, GPS/GNSS data, disparity map(s), distance data, corrections, static features, feature matching algorithm(s), and/or the like. The stereo image data can include an image pair containing a "primary" image and a "secondary" image. The primary image can be represented as the first stereo image data 112 and the secondary image can be represented as the second stereo image data 116. In some cases, the disparity map(s) can include a set of depth information calculated (e.g., by the processor 132) based on correlations between points within the image pair such as the first stereo image data 112 and the second stereo image data 116. The memory 136 can also store data representing distances travelled by the vehicle 100 between the image pairs and/or between timestamps of interest, for example as calculated (e.g., by the processor 132) based on one or more of the GPS/GNSS data, the first stereo image data 112, the second stereo image data 116, the sensor data 120, or one or more odometers of the vehicle 100.

The memory 136 of the ToF stereo calibration refinement system 180 can store instructions to cause the processor 132 to receive, from the primary camera 104A and the secondary camera 104B, the stereo image data. The stereo image data can include the first stereo imaged data 112 generated by the primary camera 104A and the second stereo image data 116 generated by the secondary camera 104B. The stereo image data that is received by the processor 132 of the ToF stereo calibration refinement system 180 can include a disparity map as described above. The disparity map can include a rectified stereo image from the first stereo image data 112 and the second stereo image data 116. In some cases, the stereo image data can be rectified by capturing the images of the check-pattern at several predefined positions within the background of a scene and the primary camera 104A and the secondary camera 104B. The x-axis can be the distance from the position of one stereo camera and the y-axis can indicate the disparity values in pixel. This disparity values can be extracted from the stereo images.

The memory 136 of the ToF stereo calibration refinement system 180 also stores instructions to cause the processor 132 to receive the sensor data 124 from the ToF sensor 120. The memory 136 also stores instructions to cause the processor 132 to project the sensor data 124 into a representation of the scene to generate multiple ToF distance measurements 144. In some implementations, projecting the sensor data 124 can include stacking the sensor data 124 on an image of the scene, the image including the stereo image data from the first stereo image data 112 and/or the second stereo image data 116. The sensor data 124 can include a variety of images, colors, values, or the like, for each pixel of an image. In some cases, the representation of the scene can include the image of the scene captured by the primary camera 104A and/or the secondary camera 104B. For example, the first stereo image data 112 and second stereo image data 116 can include disparities, where the difference is primarily due to angle rotation/position of the primary camera 104A and the secondary camera 104B. A "ToF distance measurement," as used in this disclosure, can refer to the distance traveled by a light wave and/or signal emitted from the position of a ToF sensor to an object within a scene. In some cases, the ToF sensor 120 can have a range of about 250 meters, or about 500 meters, or more than 500 meters, and the ToF sensor 120 can generate multiple ToF distance measurements 144 for objects within its range. The sensor data 124 can be represented as, or converted into, an image projection 140 containing the ToF distance measurements 144 and/or disparities such as ToF disparities 148. An "image projection," as used in this disclosure, can refer to a projection of sensor data and/or distance measurements onto an image. In some implementations, the image projection 140 can include a representation of the ToF distance measurements 144 onto the stereo image data, where the stereo image data can include the first stereo image data 112 and/or second stereo image data 116 In some cases, the stereo image data can include a disparity map of the first stereo image data 112 and the second stereo image data 116 captured by the primary camera 104A and the secondary camera 104B respectively. In some implementations, the processor 132 can be caused by the memory 136 to generate the image projection 140 using a projection function/matrix, for example to convert meters found in ToF distance measurements 144 to pixels.

The memory 136 of the ToF stereo calibration refinement system 180 further stores instructions to cause the processor 132 to identify multiple ToF disparities 148 based on the ToF distance measurements 144. A "ToF disparity," as used in this disclosure, can refer to disparities in the transit time and/or length of distance for a wave/signal to travel after reflecting off an object in a scene. For example, the ToF sensor 120 can measure ToF distance measurements 144 from the sensor data 124 while the primary camera 104A and the secondary camera 104B can generate two disparate image data and measurements. In some cases, the memory 136 of the ToF stereo calibration refinement system 180 stores instructions to identify differences between the ToF distance measurements 144 and one or more disparities in the first stereo image 112 and the second stereo image 116. The ToF disparities 148 can include the difference in measurement values from the binocular disparity from the two stereo image data such as the first stereo image data 112 and the second stereo image data 116. In some cases, the disparity measurements as represented by the ToF disparities 148 from the ToF sensor 120 can be identified using an up-sampling method associated with either the primary camera 104A or the secondary camera 104B. In some cases, the memory 136 stores instructions to further cause the processor 132 to filter the ToF distance measurements 144 prior to identifying the ToF disparities 148. In some cases, the ToF distance measurements 144 can be filtered using a machine learning model and/or a classifier. For example, the sensor data 124 and the stereo image data from the primary camera 104A and the secondary camera 104B can include disparities in measurements. The ToF stereo calibration refinement system 180 can use the machine learning model and/or classifier to filter out the data from the ToF sensor 120 and/or the primary camera 104A and the secondary camera 104B that are furthest from a predefined expected value of the measurements. In some cases, the ToF stereo calibration refinement system 180 can implement a histogram for distance measurements found in (or based on) the stereo image data and the sensor data 124, to filter out the distance measurements and to identify the ToF disparities 148.

In some embodiments, the ToF disparities 148 can include a fusion of measurements from the stereo image data produced by the primary camera 104A and the secondary camera 104B and the sensor data 124 produced by the ToF sensor 120. For example, the ToF disparities 148 can be used to estimate the depth of objects in the scene using the stereo image data, where the stereo image data can include the first stereo image data 112, the second stereo image data 116, and/or the disparity map produced from the rectification of the first stereo image data 112 and the second stereo image data 116. For example, depth and disparity in the image projection 140 are interconnected in standard parallel stereo by:

$$Z = \frac{Tf}{D}$$

where Z is the depth in Euclidian coordinates, T is the baseline, f is the focal length and D is the disparity. In some implementations, the ToF distance measurements 144 extracted from the sensor data 124 can be converted to the disparity with the primary camera 104A and the secondary camera 104B using the baseline and focal lengths of the primary camera 104A and the secondary camera 104B. As described above, ToF sensor 120 can use the timing of reflections of emitted light wave/signal(s), either using a pulsed or continuous wave operation to retrieve a time measurement. For example, the pulsed operation can include sending a pulse in which the peak of the reflection of the pulse off an object is measured by the ToF sensor 120 to detect a yield of time and distance, using:

$$t = \frac{2z}{c}, z = \frac{t}{2c}$$

where t is time, z is distance, and c is the speed of light. The ToF disparities 148 can be used to compensate for the limited range and accuracy of stereo cameras. For example, stereo cameras have extremely high accuracy up close (e.g. ≤3 m), but reduced accuracy at longer ranges due to the quadratic function of triangulation, where the resolution of the stereo cameras drops quadratically with distance. Unlike stereo cameras, the ToF sensor 120 uses an active technique since it projects light to the scene instead of ambient light. Therefore, the ToF sensor 120 can capture data even in dim light conditions. ToF sensor 120 also contains higher processing power than the stereo cameras and support greater distance ranges (e.g. 0.5 m-500 m). However, ToF sensors 120 are also limited in its capabilities of capturing depth for up-close objects. For example, the accuracy of the ToF sensor 120 is largely dependent on the distance from the object in the scene as it is generally estimated at 1% of that value. For example, if an object is 5 meters away, the ToF sensor 120 can achieve an accuracy of about 5 cm. This places the ToF sensor 120 somewhere in between stereo cameras (with precision of about 5-10% of the distance) and other structured light sensors, which the most accurate technology that can have an accuracy of as little as 1 mm. In some implementations, the ToF sensor 120 can include a radar which has an accuracy of =1-5 meters at both the near and the far end of its range. The ToF stereo calibration refinement system 180 can use sensor data 124 from the ToF sensor 120 to measure distances of objects in the scene that are further in range, while the stereo cameras can be used to provide accurate measurements of close-range objects in the scene.

In some cases, the ToF disparities 148 can include quantitative measurements describing small angle rotations. In certain angle rotations, the disparity change is a constant. The ToF disparities 148 can include pixels representing intervals of angles. ToF disparities 148 can also include shifts and/or angle rotations of a pixel that is caused by a translation in the baseline. In some instances, if there is translation, then the disparity change does depend on the distance; but for rotation, the disparity change is constant. In some examples, in the x-axis, the pixels of a location of an object in the scene can be −20.00 . . . −19.96, −19.96 . . . −9.92, −19.92 . . . −19.88 . . . −0.02 . . . 0.02 . . . 19.92 . . . 19.96, 19.96 . . . 20.00. In some cases, if the plane of the x-axis is rotated by 0.04 degrees, it is equivalent to translating the rotation by 1 pixel. The approximation of the pixel translation is most accurate in the center of an image of the scene. The approximation becomes increasingly incorrect by an offset of a quarter of a pixel once the corners of the image is reached.

In some embodiments, the ToF distance measurements 144 and/or the image projection 140 can be used for feature detections 152. A "feature detection," as used in this disclosure, can refer to a detection of features such as objects in a scene based on the measurements provided by the sensor data and stereo image data. For example, a person can view an image of a scene and identify multiple objects or features of the scene. The feature detection 152 can include indications within the ToF distance measurements 144 and or ToF disparities 148 that indicate the presence of an object in the scene. For example, the transit distance of an initial signal captured by a ToF Sensor 120 can include 4 meters which indicates that an object is 2 meters in front of the ToF sensor 120. The ToF sensor 120 can also emit another signal next to the initial signal that records a transit distance of 5 meters, confirming that there is an object in the scene and that the object is closer to the ToF Sensor 120. In some cases, the measurements representing feature detections 152 can include disparities represented by the ToF disparities 148. For example, the measurements of an object in the scene can indicate that the object is present, but based on the type of sensor/camera, the measurements may contain disparities of the exact positioning and location of the object. The feature detection 152 can include detection of static features in the scene such as bridges, road signs, traffic lights, stationary vehicles, and the like. The feature detections 152 can be conducted using feature matching algorithm(s) such as KAZE, AKAZE, Oriented FAST and rotated BRIEF (ORB), BRISK, SIFT, and SURF.

The memory 136 also stores instructions to cause the processor 132 to select a subset of ToF disparities from the ToF disparities 148. A "subset of ToF disparities," as used in this disclosure, can refer to a subset of ToF disparities from the ToF disparities that contain disparities that are close to an expected disparity value from a non-zero set of ToF disparities. In some cases, the expected disparity value can include a subset of pixels, coordinate values, distance measurements, or the like, for which the received stereo image data, such as the first stereo image data 112 and the second stereo image data 116, is intended to be. For example, there could be greater disparities in measurements for objects in the scene that are very close (e.g. ≤2 m) to the primary camera 104A, the secondary camera 104B, the ToF sensor 120 and/or objects in the scene that are further away (e.g. 4-5 m). Because stereo cameras are less accurate at measuring depth at objects further away compared to ToF sensors and ToF sensors are less accurate at measuring depth at objects that are closer to the sensors/cameras, the disparities at both ends of the ranges of the sensors/cameras are much greater than the disparities of measurements for objects that are well within the sensors/cameras range.

In some embodiments, the memory 136 of the ToF stereo calibration refinement system 180 stores instructions to cause the processor 132 to assign a vote, from a multiple of votes, to each ToF disparity from the multiple ToF disparities 148 to produce a set of ranked ToF disparities. The subset of ToF disparities can be selected based on the set of ranked ToF disparities. Due to the low resolution of the ToF sensor 120, the ToF disparities 148 based on the ToF distance measurements 144 must be filtered. The ToF disparities 148 can be filtered using a voting scheme. A "voting scheme," as used in this disclosure, can refer to a voting algorithm used to filter disparities found in measurements from stereo cameras and/or a ToF sensor. The memory 136 can store instructions to cause the processor 132 to generate a histogram 160 containing ToF disparities 148 and/or any disparity map(s) as described herein. The histogram can be based on the proximity of each ToF disparity from the multiple ToF disparities 148 to the expected disparity value from the non-zero set of multiple expected disparity values identify at least one ToF disparity from the plurality as being associated with a peak of the histogram. The peak of the histogram can represent ToF disparities 148 that have disparity values lower than other ToF disparities 148 and/or any remaining ToF disparities 148 resulting from the voting scheme. In some cases, the voting can be conducted using a voting classifier. A "voting classifier," as used in this disclosure, can refer to a machine learning estimator that trains various base models or estimators and predicts on the basis of aggregating the findings of each base estimator. The aggregating criteria can be combined decision of voting for each output of the voting classifier 156, which can include a vote for which the subset of ToF disparities can be selected. In some cases, the vote can be implemented via a manual user input that the user believes a ToF disparity of the subset of ToF disparities can be selected for. In some implementations of the voting scheme, two voting criteria can also be implemented, such as hard voting, where voting is calculated on the predicted output of the voting classifier 156 which represents the ToF disparities closest to the expected disparity value and soft voting, which is calculated based on a predicted probability of the ToF disparities closest to the expected disparity value. The selected subset of ToF disparities can include one or more disparities that are ranked the highest in a ranked set of ToF disparities.

ToF stereo calibration refinement system 180 enables the selection of the subset of ToF disparities which is applied onto the original stereo image data, which can include the first stereo image data 112, the second stereo image data 116, and/or a fusion of the first stereo image data 112 and the second stereo image data 116 (e.g., disparity map(s)). In some cases, the ToF disparities 148 can include disparities about the distance of an object form the stereo cameras and/or ToF sensors 120. The selection can include selecting which disparity is to be applied onto the stereo image data based on the histogram 150 and/or the voting. Alternatively or additionally, the selection can be used to train the voting classifier 156 to select a future subset of ToF disparities more efficiently. In some cases, the selection can also be used to update the histogram 160 with a greater peak indicating that the most of ToF disparities 148 are located at the center of the histogram and closer to the expected.

The memory 136 can also store instructions for the processor 132 to produce a modified disparity map 168. A "modified disparity map," as used in this disclosure, can refer to a corrected stereo image data based on the selected subset of ToF disparities. The memory 136 of the ToF stereo calibration refinement system 180 can also store instructions to cause the processor 132 to perform a smoothing function 164 on the resulting stereo corrections (e.g. the modified disparity map 168). The smoothing function can include exponential moving average to account for extrinsic parameters associated with the primary camera 104A and the secondary camera 104B, such as temperature changes, vehicle movement, wind speed, precipitation, or the like.

The memory 136 can store further instructions for the processor 132 to apply the correction and/or produce the modified disparity map data 168 remotely from one or more remote compute devices, such as ToF stereo calibration refinement system 180, via connection with a network 172. The transceiver 172 can receive the first stereo image data 116, sensor data 124, or the like, and send them to the ToF stereo calibration refinement system 180 for which the correction can be applied remotely. In some instances, the correction resulting in the modified disparity map 168 can be consistent with the correction in U.S. patent application Ser. No. 17/855,168. The corrections can include one or more corrections to coordinate values (e.g., depth values) of one or more of the disparity map(s). In some cases, the correction can be uniform across the entire range of the stereo image data from the primary camera 104A and the secondary camera 104B. In some instances, the correction can be applied at a rate of 10 times a seconds with the smoothing function 164. Once the corrections are applied, the ToF stereo calibration refinement system 180 can be deployed onto the vehicle 100 and/or the vehicle 100 can store a copy of the ToF stereo calibration refinement system 180 in the vehicle's 100 memory 184.

Figure 2:
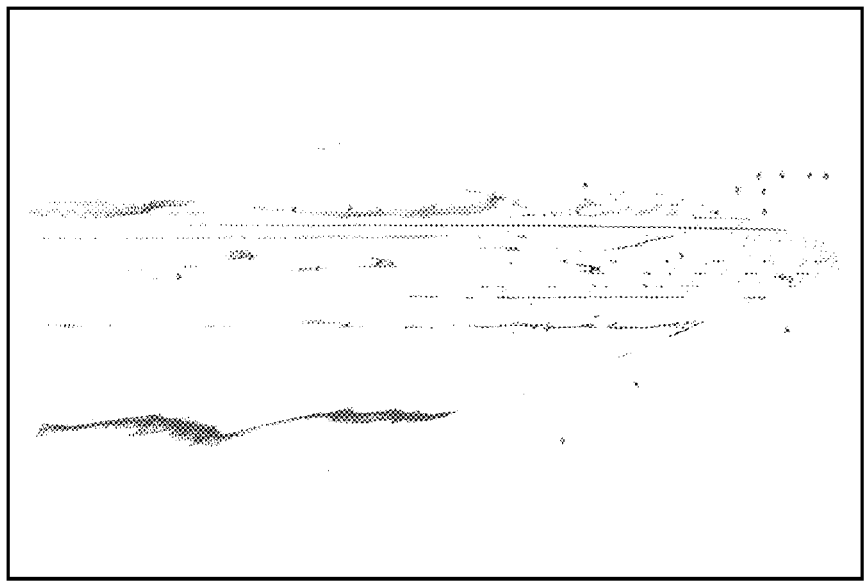
FIG. 2 is an example image displaying errors in stereo rectification, according to some embodiments.
Figure 2:
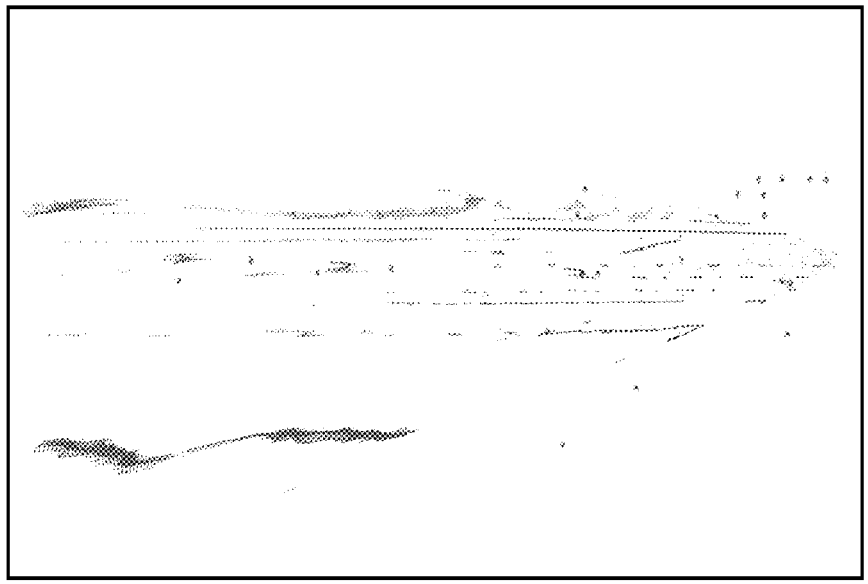

FIG. 2 is an example image displaying errors in stereo rectification, according to some embodiments. Stereo rectification can produce tiny errors along the axis of the baseline of two stereo cameras/lenses. For example, a first image 200 shows a stereo image captured by a stereo camera system before correction. The first image 200 can include a stereo rectification error in the form of rotation around the Y axis. This rotation can be referred to as "Yaw" due to the first image 200 corresponding with the yaw direction of the Tait-Bryan angles of a vehicle, for example when a stereo camera system is mounted on the vehicle, such as on the vehicle's windshield. A second image 204 shows a corrected stereo image captured by the stereo camera system. The second image 204 shows one or more slight variations in location of certain objects compared to the first image 200.

Figure 3:
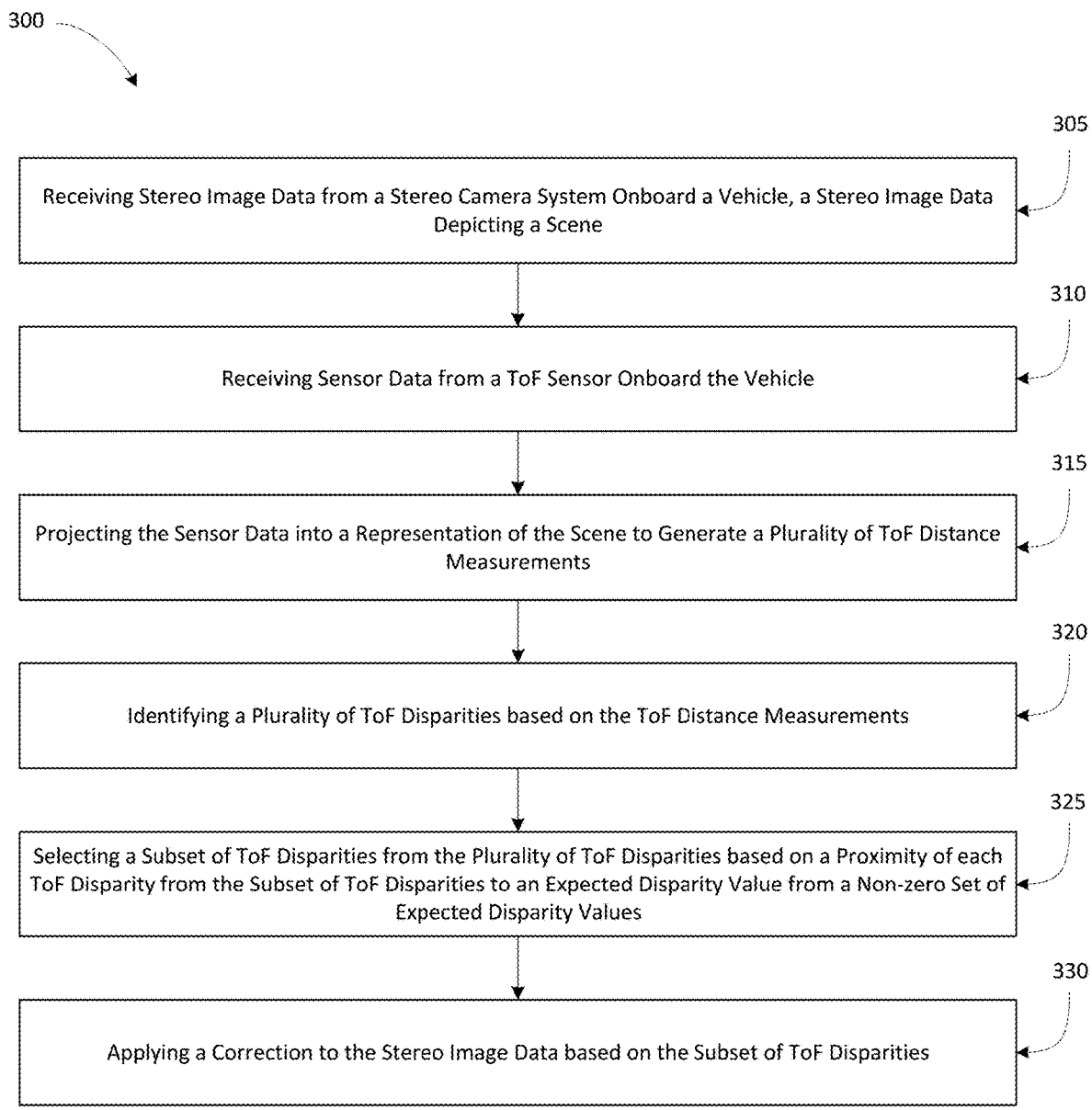
FIG. 3 is a diagram illustrating a first method for correcting stereo image data based on one or more ToF disparities, according to some embodiments.

FIG. 3 is a diagram illustrating a method 300 for correcting stereo image data based on one or more ToF disparities, according to some embodiments. At step 305, method 300 includes receiving stereo image data from a stereo camera system onboard a vehicle, a stereo image data depicting a scene. The scene can include any image of the environment or surroundings of the vehicle during operation of the vehicle. In some implementations, the stereo camera system can include a primary camera and a secondary camera. The stereo image data can include a first stereo image data from the primary camera and a second stereo image data from the secondary camera. In some implementations, the stereo camera system is onboard a vehicle such as an autonomous vehicle. In some cases, at step 305, the method 300 can also include receiving, by a ToF stereo calibration refinement system located offboard the vehicle, the stereo image data including the first stereo image data and the second stereo data.

At step 310, the method 300 includes receiving sensor data from a ToF sensor onboard the vehicle. The ToF sensor can include a radar sensor and/or a LIDAR sensor. In some implementations, the vehicle can include multiple ToF sensors onboard the vehicle to generate sensor data from multiple angles. In some cases, at step 310, the method 300 can also include receiving, by the ToF stereo calibration refinement system located offboard the vehicle, the sensor data.

At step 315, the method 300 includes projecting the sensor data into a representation of the scene to generate multiple ToF distance measurements. In some implementations, projecting the sensor data can include stacking/superposing the sensor data on an image of the scene, the image including the stereo image data from the first stereo image data and/or the second stereo image data. The sensor data can include a variety of images, colors, values, or the like, for each pixel of an image. In some cases, projecting the sensor data into the representation of the scene can include associating ToF data (sensor data) with stereo data (first stereo image data and second stereo image data) by projecting the ToF data into the stereo image to filter out stereo depth errors. Projecting the sensor data into the representation of the scene can also include using a projection matrix and/or an image projection to convert distance measurements of objects in the scene of the image to pixels and/or coordinates. In some cases, step 315, at method 300, can include producing an image projection containing the ToF distance measurements representing the scene. In some implementations, the image projection can include the stereo image data associated with the sensor data from the ToF sensor.

At step 320, the method 300 includes identifying multiple ToF disparities based on the ToF distance measurements. In some cases, identifying the multiple ToF disparities, at step 320, can include identifying disparities in distance measurements of objects in the scene within the stereo image data based on intrinsic/extrinsic parameters of the stereo camera system and/or the ToF technology of the ToF sensor. In some cases, prior to identifying multiple ToF disparities, the method 300 can include filtering the ToF distance measurements from the plurality of ToF distance measurements.

At step 325, the method 300 includes selecting a subset of ToF disparities from the plurality of ToF disparities based on a proximity of each ToF disparity from the subset of ToF disparities to an expected disparity value from a non-zero set of expected disparity values. The method 300 can also include assigning a vote (not shown), from a plurality of votes, to each disparity from the multiple ToF disparities. In some implementations, selecting the subset of disparities can include generating a histogram (not shown) based on the proximity of each disparity from the plurality of disparities to the expected disparity value from the non-zero set of expected disparity values and identifying at least one disparity from the plurality of disparities as being associated with a peak of the histogram.

Figure 4:
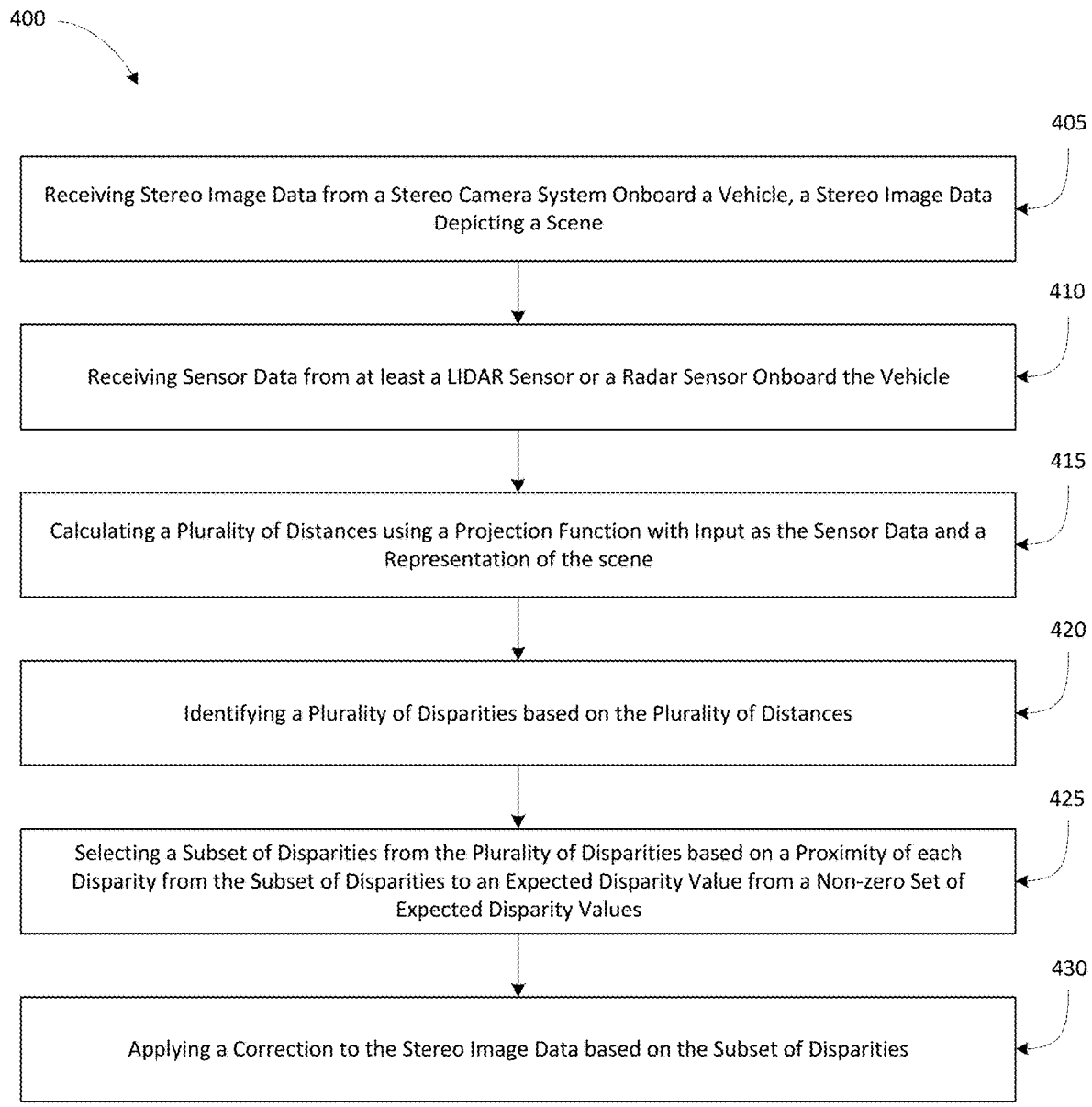
FIG. 4 is a diagram illustrating a second method for correcting stereo image data based on one or calculated distances, according to some embodiments.

At step 330, the method 300 includes applying a correction to the stereo image data based on the subset of ToF disparities. Applying the correction to the stereo image data can include generating a modified disparity map or multiple modified disparity maps. In some implementations, the method 300 can also include applying a smoothing function to the correction (not shown) to account for an extrinsic parameter associated with the stereo camera system. In some cases, applying the smoothing function can include applying an exponential moving average. resulting modified disparity map can include controlling an operation of the vehicle based on the modified disparity map. For example, the modified disparity map can display a corrected location of a static feature in the scene for which an appropriate operation of the vehicle can be performed FIG. 4 is a diagram illustrating a method 400 for correcting stereo image data based on one or calculated distances, according to some embodiments. At step 405, method 400 includes receiving stereo image data from a stereo camera system onboard a vehicle, a stereo image data depicting a scene. The scene can include any image of the environment or surroundings of the vehicle during operation of the vehicle. In some implementations, the stereo camera system includes a primary camera and a secondary camera. The stereo image data can include a first stereo image data from the primary camera of the stereo camera system and a second stereo image data from the secondary camera of the stereo camera system. In some implementations, the stereo camera system is onboard a vehicle such as an autonomous vehicle. In some cases, at step 405, the method 400 can also include receiving, by a ToF stereo calibration refinement system located offboard the vehicle, the stereo image data including the first stereo image data and the second stereo data.

At step 410, the method 400 includes receiving sensor data from at least a LIDAR sensor or a radar sensor onboard the vehicle. In some implementations, the vehicle can include multiple LIDAR sensor or radar sensors onboard the vehicle to generate sensor data from multiple angles of the scene and/or multiple difference scenes. In some cases, at step 410, the method 400 can also include receiving, by the ToF stereo calibration refinement system located offboard the vehicle, the sensor data.

At step 415, the method 400 includes calculating multiple distances using a projection function with input as the sensor data and the stereo image data. In some cases, the multiple distances can include multiple ToF distance measurements. The projection function can include a projection matrix and/or an image projection to convert distance measurements found in the distances of elements of an object in the depicted scene to pixels and/or coordinates. In some implementations, the method 400 can include, prior to calculating multiple distances, filtering multiple distances. Filtering multiple distances can include using a voting scheme to eliminate distances that are far away from an expected distance value. In some cases, at step 415, the method 400 can include calculating the multiple distances by a ToF stereo calibration refinement system located offboard the vehicle. The ToF stereo calibration refinement system can receive the stereo image data and the sensor data via a transceiver, which can be located at both the vehicle and the offboard ToF stereo calibration refinement system.

At step 420, the method 400 includes identifying multiple disparities based on the multiple distances. In some cases, the disparities can include ToF disparities. In some implementations, the multiple distances, at step 420, can include identifying disparities in distance measurements of objects in the scene within the stereo image data based on intrinsic/extrinsic parameters of the stereo camera system and/or the ToF technology of the at least a LIDAR sensor or the radar sensor. In some cases, prior to identifying multiple disparities, the method 400 can include filtering the distances from the multiple distances.

At step 425, the method 400 includes selecting a subset of disparities based on a proximity of each disparity from the subset of disparities to an expected disparity value from a non-zero set of expected disparity values. The method 400 can also include assigning a vote (not shown), from a plurality of votes, to each disparity from the multiple disparities. In some implementations, selecting the subset of disparities can include generating a histogram (not shown) based on the proximity of each disparity from the plurality of disparities to the expected disparity value from the non-zero set of expected disparity values and identifying at least one disparity from the plurality of disparities as being associated with a peak of the histogram.

At step 430, the method 400 includes applying a correction to the stereo image data based on the subset of disparities. Applying the correction to the stereo image data can include generating a modified disparity map or multiple modified disparity maps. In some implementations, the method 400 can also include applying a smoothing function to the correction (not shown) to account for an extrinsic parameter associated with the stereo camera system. In some cases, applying the smoothing function can include applying an exponential moving average, resulting modified disparity map can include controlling an operation of the vehicle based on the modified disparity map. For example, the modified disparity map can display a corrected location of a static feature in the scene for which an appropriate operation of the vehicle can be performed.

Figure 5:
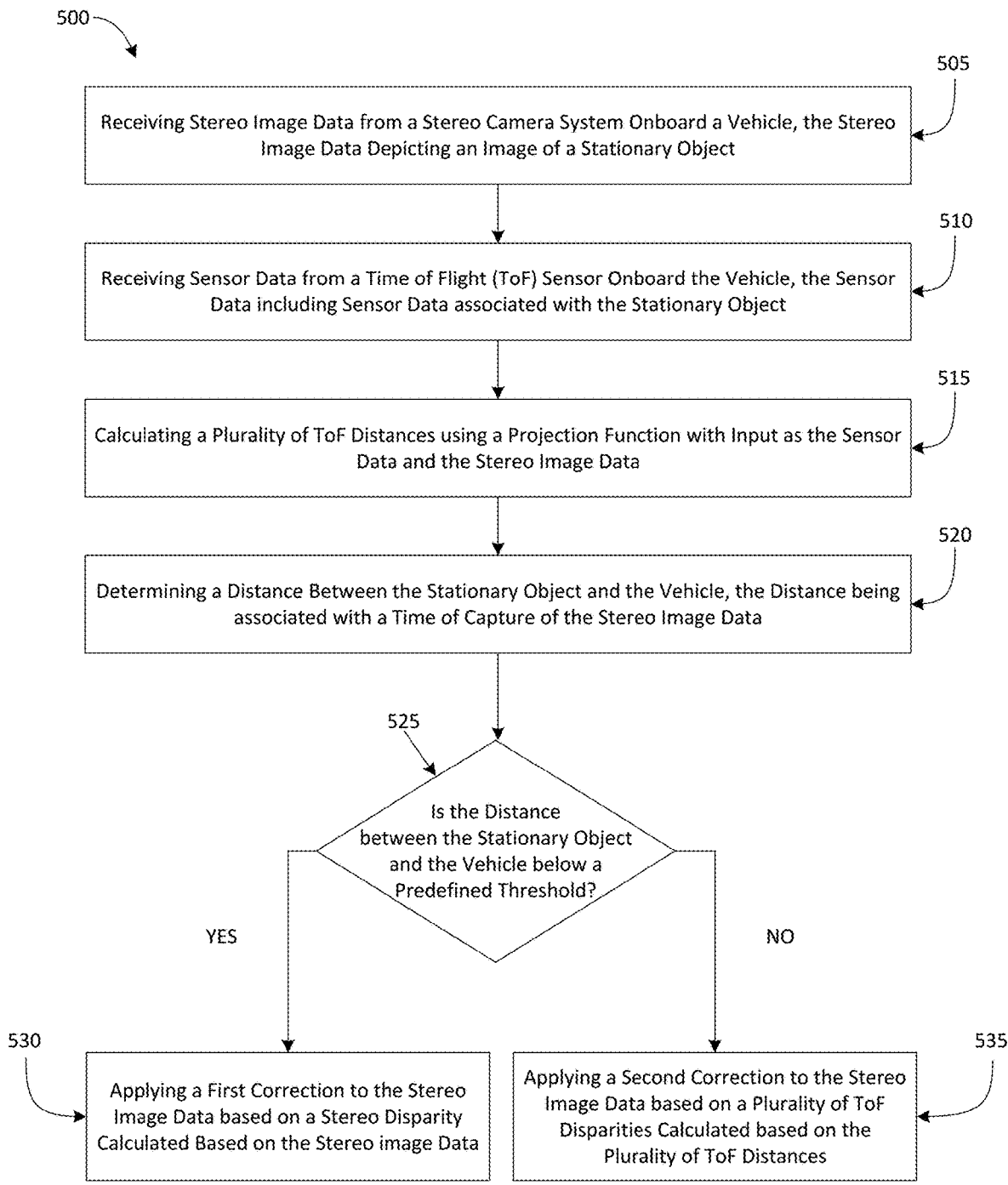
FIG. 5 is a diagram illustrating a method for selecting a correction for stereo image data based on a distance between a stationary object and a vehicle, according to some embodiments.

FIG. 5 is a diagram illustrating a method 500 for selecting a correction for stereo image data based on a distance between a stationary object and a vehicle, according to some embodiments. At step 505, the method 500 includes receiving stereo image data from a stereo camera system onboard the vehicle, the stereo image data depicting an image of a stationary object. The stationary object can include one or more static features as described herein. The stereo camera system can include a primary camera and a secondary camera, each of which can be consistent with any stereo camera as described in the entirety of this disclosure.

At step 510, the method 500 includes receiving sensor data from a ToF sensor onboard the vehicle, the sensor data including sensor data associated with the stationary object. The ToF sensor can be consistent with any ToF sensor as described in the entirety of this disclosure, such as a radar sensor and/or a LIDAR sensor.

At step 515, the method 500 includes calculating multiple ToF distances using a projection function with input as the sensor data and the stereo image data. The projection function can include a projection matrix to convert distance measurements found in the ToF distances to pixels. In some implementations, the method 400 can include, prior to calculating multiple ToF distances, filtering multiple ToF distances. Filtering multiple ToF distances can include using a voting scheme to eliminate ToF distances that are far away from an expected ToF distance value. In some cases, at step 515, the method 500 can include calculating the multiple ToF distances by a ToF stereo calibration refinement system located offboard the vehicle. The ToF stereo calibration refinement system can receive the stereo image data and the sensor data via a transceiver which can be located at both the vehicle and the offboard ToF stereo calibration refinement system.

At step 520, the method 500 includes determining a distance between the stationary object and the vehicle, the distance being associated with a time of capture of the stereo image data. The distance can be measured by the ToF sensor.

At step 525, the method 500 includes a conditional step of determining whether the distance between the stationary object and the vehicle is below a predefined threshold. The predefined threshold value can include, for example, an expected distance value.

At step 530, the method 500 includes applying a first correction to the stereo image data based on a stereo disparity calculated based on the stereo image data if the distance between the stationary object and the vehicle is below the predefined threshold of step 525.

At step 535, the method 500 includes applying a second correction to the stereo image data based on a plurality of ToF disparities calculated based on the plurality of ToF distances if the distance between the stationary object and the vehicle is not below the predefined threshold of step 525.

In some embodiments, prior to step 535, the method 500 can include calculating the plurality of ToF disparities using a voting process or scheme. For example, the sensor data from the ToF sensor can be low resolution, resulting in ToF disparities based on the ToF distances. The voting scheme can include filtering the ToF disparities by generating a histogram containing ToF disparities. In some cases, the voting scheme can be conducted by a voting classifier. The histogram can be based on the proximity of each ToF disparity from the multiple ToF disparities to an expected disparity value from a non-zero set of multiple expected disparity values such as the predefined threshold to identify at least one ToF disparity from the plurality of ToF disparities as being associated with a peak of the histogram. The peak of the histogram can represent ToF disparities that have disparity values lower than other ToF disparities. In some cases, the voting scheme can include receiving votes from a manual user input that a user believes a ToF disparity of the subset of ToF disparities can be selected for.

Following step 530 or step 535, the method 500 can also include producing a modified disparity map based on either the first correction to the stereo image data or the second correction to the stereo image data. The method 500 can also include controlling an operation of the vehicle based on the modified disparity map. The operation can include controlling the vehicle to make a left turn, right turn, decelerate, accelerate, or the like.

It is to be noted that any one or more of the aspects and embodiments described herein can be conveniently implemented using one or more machines (e.g., one or more compute devices that are utilized as a user compute device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules can also include appropriate hardware for assisting in the implementation of the machine executable instructions of the software and/or software module.

Such software can be a computer program product that employs a machine-readable storage medium. A machine-readable storage medium can be any medium that is capable of storing and/or encoding a sequence of instructions for execution by a machine (e.g., a compute device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software can also include information (e.g., data) carried as a data signal on a data carrier, such as a carrier wave. For example, machine-executable information can be included as a data-carrying signal embodied in a data carrier in which the signal encodes a sequence of instruction, or portion thereof, for execution by a machine (e.g., a compute device) and any related information (e.g., data structures and data) that causes the machine to perform any one of the methodologies and/or embodiments described herein.

Examples of a compute device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a compute device can include and/or be included in a kiosk.

All combinations of the foregoing concepts and additional concepts discussed herewithin (provided such concepts are not mutually inconsistent) are contemplated as being part of the subject matter disclosed herein. The terminology explicitly employed herein that also can appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments can be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments cannot have been presented for a specific portion of the innovations or that further undescribed alternate embodiments can be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments can be utilized and functional, logical, operational, organizational, structural and/or topological modifications can be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For example, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general-purpose processor, a central processing unit (CPU), a microprocessor, a digital signal processor (DSP), a controller, a microcontroller, a state machine and so forth. Under some circumstances, a "processor" can refer to an application specific integrated circuit (ASIC), a programmable logic device (PLD), a field programmable gate array (FPGA), etc. The term "processor" can refer to a combination of processing devices, e.g., a combination of a DSP and a microprocessor, multiple microprocessors, one or more microprocessors in conjunction with a DSP core or any other such configuration.

The term "memory" should be interpreted broadly to encompass any electronic component capable of storing electronic information. The term memory can refer to various types of processor-readable media such as random-access memory (RAM), read-only memory (ROM), non-volatile random-access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" can refer to one or more programs, routines, subroutines, functions, procedures, etc. "Instructions" and "code" can comprise a single computer-readable statement or many computer-readable statements.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules can include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts can be embodied as one or more methods, of which at least one example has been provided. The acts performed as part of the method can be ordered in any suitable way. Accordingly, embodiments can be constructed in which acts are performed in an order different than illustrated, which can include performing some acts simultaneously, even though shown as sequential acts in illustrative embodiments. Put differently, it is to be understood that such features can not necessarily be limited to a particular order of execution, but rather, any number of threads, processes, services, servers, and/or the like that can execute serially, asynchronously, concurrently, in parallel, simultaneously, synchronously, and/or the like in a manner consistent with the disclosure. As such, some of these features can be mutually contradictory, in that they cannot be simultaneously present in a single embodiment. Similarly, some features are applicable to one aspect of the innovations, and inapplicable to others.

In addition, the disclosure can include other innovations not presently described. Applicant reserves all rights in such innovations, including the right to embodiment such innovations, file additional applications, continuations, continuations-in-part, divisional s, and/or the like. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein can be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

As used herein, "substantially concurrently" can refer to events that take place at the same time when adjusted for processing-related delays (e.g., computation delay, transmission delay, etc.), or can refer to events that overlap in time.

As used herein, "substantially in real-time" can refer to an event that occurs immediately following a predicate event, adjusted for processing-related delays (e.g., computation delay, transmission delay, etc.).

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A system, comprising:
   a stereo camera system onboard a vehicle;
   a Time of Flight (ToF) sensor onboard the vehicle;
   at least one processor; and
   a memory operably coupled to the at least one processor and storing instructions to cause the system to perform operations comprising:
      receiving, from the stereo camera system, stereo image data depicting a scene, the scene including a stationary object, the stereo image data depicting the scene captured by the stereo camera system at a first time;
      receiving sensor data from the ToF sensor;
      projecting the sensor data into a representation of the scene, to generate a plurality of ToF distance measurements;
      identifying a plurality of ToF disparities based on the ToF distance measurements;
      selecting a subset of ToF disparities from the plurality of ToF disparities based on proximities of the plurality of ToF disparities to an expected disparity value from a non-zero set of expected disparity values;
      determining a distance between the stationary object and the vehicle, the distance being associated with the first time; and
      applying a correction to the stereo image data by:
         when the distance between the stationary object and the vehicle is below a predefined threshold, applying a first correction to the stereo image data based on a stereo disparity calculated based on the stereo image data, and
         when the distance between the stationary object and the vehicle is not below the predefined threshold, applying a second correction to the stereo image data based on the subset of ToF disparities.

2. The system of claim 1, wherein the ToF sensor is a lidar sensor.

3. The system of claim 1, wherein the ToF sensor is a radar sensor.

4. The system of claim 1, wherein selecting the subset of ToF disparities from the plurality of ToF disparities comprises:
   assigning votes to the plurality of ToF disparities to produce a set of ranked ToF disparities, the subset of ToF disparities being selected based on the set of ranked ToF disparities.

5. The system of claim 1, wherein selecting the subset of ToF disparities from the plurality of ToF disparities comprises:
   generating a histogram based on the proximities of the plurality of ToF disparities to the expected disparity value from the non-zero set of expected disparity values;
   identifying at least one ToF disparity from the plurality of ToF disparities as being associated with a peak of the histogram; and
   selecting the at least one ToF disparity as part of the subset of ToF disparities.

6. The system of claim 1, further comprising:
   causing the processor to filter the plurality of ToF distance measurements prior to identifying the plurality of ToF disparities.

7. The system of claim 1, wherein applying the correction to the stereo image data based on the subset of ToF disparities comprises:
   applying a smoothing function to the correction to account for an extrinsic parameter associated with the stereo camera system.

8. A non-transitory, computer-readable storage medium storing instructions that, when executed by at least one processor of a computing system, cause the computing system to perform operations comprising:
   receiving stereo image data from a stereo camera system onboard the vehicle, the stereo image data depicting an image of a stationary object, the stereo image data depicting the image of the stationary object captured at a first time;
   receiving sensor data from a Time of Flight (ToF) sensor onboard the vehicle, the sensor data including sensor data associated with the stationary object;
   calculating a plurality of ToF distances using a projection function with input as the sensor data and the stereo image data;
   determining a distance between the stationary object and the vehicle, the distance being associated with the first time; and
   applying a correction to the stereo image data by:
      when the distance between the stationary object and the vehicle is below a predefined threshold, applying a first correction to the stereo image data based on a stereo disparity calculated based on the stereo image data, and
      when the distance between the stationary object and the vehicle is not below the predefined threshold, applying a second correction to the stereo image data based on a plurality of ToF disparities calculated based on the plurality of ToF distances.

9. The non-transitory, computer-readable medium of claim 8, wherein the ToF sensor is a lidar sensor.

10. The non-transitory, computer-readable medium of claim 8, wherein the ToF sensor is a radar sensor.

11. The non-transitory, computer-readable medium of claim 8, the operations further comprising:
    calculating the plurality of ToF disparities using a voting scheme.

12. The non-transitory, computer-readable medium of claim 11, the operations further comprising:
    filtering the plurality of ToF distances prior to calculating the plurality of ToF disparities.

13. The non-transitory, computer-readable medium of claim 8, wherein:
- at least one of the first correction to the stereo image data or the second correction to the stereo image data results in a modified disparity map; and
- the operations further comprising controlling an operation of the vehicle based on the modified disparity map.

14. A computer-implemented method, comprising:
- receiving stereo image data from a stereo camera system onboard a vehicle, the stereo image data depicting a scene, the scene including a stationary object, the stereo image data depicting the scene captured by the stereo camera system at a first time;
- receiving sensor data from at least one of a lidar sensor or a radar sensor onboard the vehicle;
- calculating a plurality of distances using a projection function with input as the sensor data and a representation of the scene;
- identifying a plurality of disparities based on the plurality of distances;
- selecting a subset of disparities from the plurality of disparities based on proximities of the plurality of disparities to an expected disparity value from a non-zero set of expected disparity values; and
- determining a distance between the stationary object and the vehicle, the distance being associated with the first time;
- applying a correction to the stereo image data by:
  - when the distance between the stationary object and the vehicle is below a predefined threshold, applying a first correction to the stereo image data based on a stereo disparity calculated based on the stereo image data, and
  - when the distance between the stationary object and the vehicle is not below the predefined threshold, applying a second correction to the stereo image data based on the subset of disparities.

15. The computer-implemented method of claim 14, wherein the selecting the subset of disparities from the plurality of disparities comprises:
- assigning votes to the plurality of disparities.

16. The computer-implemented method of claim 14, wherein the selecting the subset of disparities from the plurality of disparities comprises:
- generating a histogram based on the proximities of the disparities to the expected disparity value from the non-zero set of expected disparity values;
- identifying at least one disparity from the plurality of disparities as being associated with a peak of the histogram; and
- selecting the at least one disparity as part of the subset of disparities.

17. The computer-implemented method of claim 14, wherein the applying the correction to the stereo image data based on the subset of disparities comprises:
- applying a smoothing function to the correction to account for an extrinsic parameter associated with the stereo camera system.

18. The computer-implemented method of claim 14, wherein the correction results in a modified disparity map, the operations further comprising:
- controlling an operation of the vehicle based on the modified disparity map.

19. The system of claim 1, wherein the correction results in a modified disparity map, the operations further comprising:
- controlling an operation of the vehicle based on the modified disparity map.

20. The system of claim 1, wherein projecting the sensor data into a representation of the scene comprises:
- filtering out stereo depth errors by projecting the sensor data into the stereo image data.

* * * * *